(No Model.) 2 Sheets—Sheet 1.
E. W. RICE, Jr.
REGULATING ALTERNATING CURRENT DYNAMO ELECTRIC MACHINES.
No. 595,412. Patented Dec. 14, 1897.
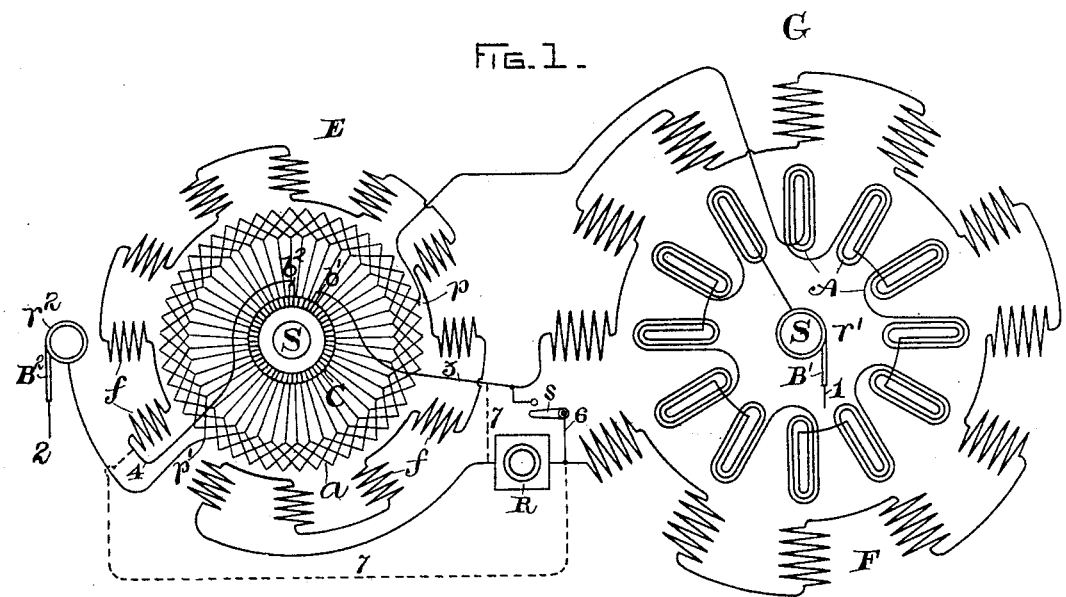
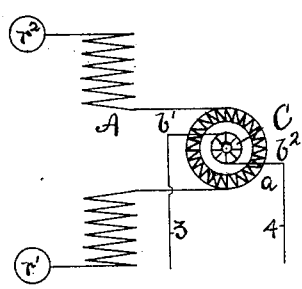
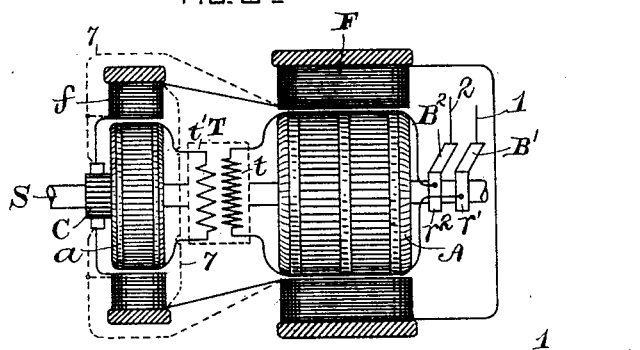
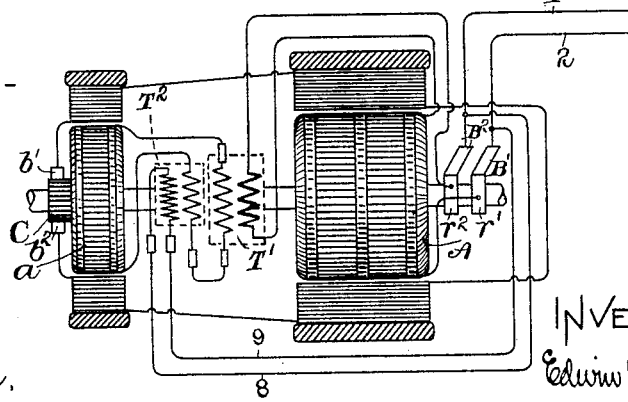
WITNESSES
A. F. Macdonald
J. J. Johnston
INVENTOR
Edwin W. Rice Jr.
by
Geo. R. Blodgett
Atty.

(No Model.)  2 Sheets—Sheet 2.
E. W. RICE, Jr.
REGULATING ALTERNATING CURRENT DYNAMO ELECTRIC MACHINES.
No. 595,412.  Patented Dec. 14, 1897.
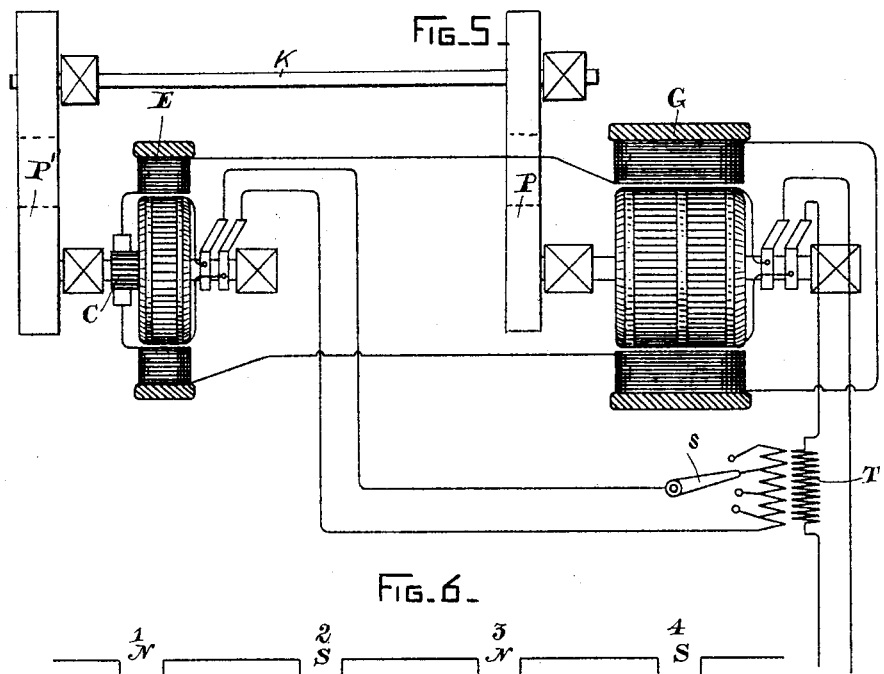
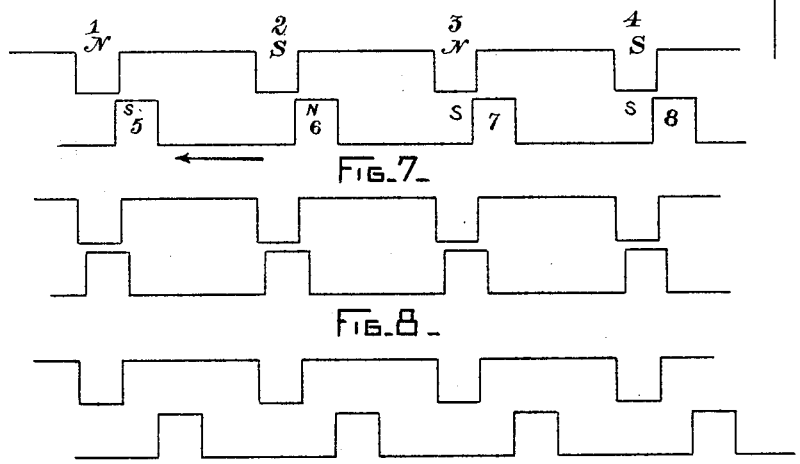
Witnesses—
A. F. Macdonald.
T. J. Johnston
Inventor—
Edwin W. Rice, Jr.
by
Geo. R. Blodgett,
Atty.

United States Patent Office.

EDWIN WILBUR RICE, JR., OF SCHENECTADY, NEW YORK, ASSIGNOR TO THE THOMSON-HOUSTON ELECTRIC COMPANY, OF SAME PLACE.

REGULATING ALTERNATING-CURRENT DYNAMO-ELECTRIC MACHINES.

SPECIFICATION forming part of Letters Patent No. 595,412, dated December 14, 1897.

Application filed October 26, 1894. Serial No. 527,031. (No model.)

*To all whom it may concern:*

Be it known that I, EDWIN WILBUR RICE, Jr., a citizen of the United States, residing at Schenectady, in the county of Schenectady, State of New York, have invented certain new and useful Improvements in the Method of and Means for Regulating Alternating-Current Dynamo-Electric Machines or Distribution Systems, of which the following is a specification.

The present invention relates to an improved method of and means for regulating dynamo-electric machines or distribution systems comprising a number of novel steps and features capable of being applied in a wide variety of ways. The particular application of these novel features, which will be described hereinafter at length, is a mode of regulating or compounding alternating-current dynamo-electric machines whose field-coils are energized by an exciting-machine without the necessity of commuting the whole or any portion of the main current, as has heretofore been the practice, and, furthermore, compounding or compensating not only for changes of current under different conditions of load, but also for changes in the phase relation of current and electromotive force which arise from time to time in alternating-current distribution systems from various causes well known to electrical engineers.

It is well known that when the load on any dynamo-electric machine acting as a generator increases the resistance drop also increases and the terminal voltage falls. The voltage at any distant point on the distribution system falls at the same time and to an even greater extent; but where alternating-current generators are used any change in the phase relations between current and electromotive force in the main circuit of the machine causes a change in the voltage at any point in the system. I understand this action to be due to several causes, of which the most important are, first, an increase of lag tends to increase the drop due to self-induction in the armature, and, second, an increase of lag tends to increase the armature reaction. With constant internal electromotive force and with any given positive amounts of resistance and self-induction in the armature the terminal voltage of the machine will be different from, and usually smaller than, the internal electromotive force. The terminal voltage will also in general lag behind the internal electromotive force. It is therefore necessary in order to maintain constant voltage at the brushes to increase the internal electromotive force with any increase of load or of lag in the main circuit and to decrease it with any decrease of load or of lag. Furthermore, it is necessary, up to a certain point at least, to decrease the internal electromotive force with any increase of lead in the main current, for any small lead of the main current in advance of the terminal electromotive force of the machine will only tend to bring it more nearly in phase with the internal electromotive force and thus reduce the inductive drop of the armature and the armature reaction.

In the above discussion it has been assumed that straight compounding is desired, but it is well known in the art that it is often desirable to attain overcompounding—that is to say, it may be desirable to maintain constant voltage at any selected point in the system. If this point is at the brushes of the generator, the compounding is straight. If this point is at any distance from the brushes—as, for example, at the translating devices or at some selected point in the network—the machine is said to be adjusted for overcompounding. In the first case we have to consider only the resistance and reactance of the machine, while in the second case the resistance and reactance of the transmission-lines up to the selected point, as well as the effective resistance and reactance of the step-up transformer, if one be used, must be taken into account. It will appear later that my invention is equally applicable to either of these needs.

Briefly stated, the specific method of compounding described and illustrated in this application consists in passing the current of the main machine by suitable electrical inductive connections through the armature or current-generating member of the exciter, thereby producing in the exciter-armature alternating polarities which reverse in synchronism with the movements of the armature in space across its field-poles. By the reactive influence upon the field of the exciter of the alternating current thus fed through its armature the resultant field magnetism of the exciter, and consequently its voltage, is varied automatically from time to time, so that the current derived from its commutator and used for exciting the field of the main machine preserves the field magnetization of the main machine of such value as renders the machine self-regulating under varying conditions of load. In some instances the results to be secured will make it advisable to pass through the exciter-armature not the main current of the machine, but a current proportional to the voltage of the machine. In the one case the main current or a shunted portion of the main current is fed to the armature of the exciter. In the other case the armature of the exciter will be included in a shunt-circuit across the brushes of the main machine or the circuit-wires connected thereto. It is, however, not my intention to limit the novelty of this application solely to such a method of compounding separately-excited alternators as has been outlined, since the invention comprises radically novel features which are useful in many other systems and combinations. Prominent among these is the mode in which the exciter, considered simply as a dynamo-machine, apart from its combination with the main alternator, is regulated; secondly, the automatic regulation of dynamo machines or systems so as to compensate for the effects of lagging and leading currents in the external circuit.

Heretofore it has been customary to regulate dynamos in various ways—for example, by a resistance in series with or in shunt around the field-circuits, or by shifting the brushes, or by other ways which need not be mentioned. In the system now proposed regulation is secured automatically by the reactive influence upon the field of the machine of an alternating current which is caused to flow in its armature, and the expedients which have heretofore been resorted to may be dispensed with altogether or at all events used simply as auxiliaries to the novel method of regulation just mentioned. It is evident that a dynamo so regulated may be used for many other purposes than to excite the field of a second machine, and hence the novelty of this part of the invention is by no means confined to the combination of a main generator and exciter which mutually serve to regulate each other.

Furthermore, it has heretofore been proposed to compensate the effects of leading and lagging currents in an alternating-current system by special phase-controllers by which the phase relation of the current and electromotive force may be varied at will.

In the present invention the effects of changes in the phase relation of current and electromotive force are corrected by regulating the main machine or machines. For example, if the current in the circuit of an alternating generator lags behind the impressed electromotive force at the terminals of the machine the potential will become less than it would be under the same conditions were the current in phase with the electromotive force. On the contrary, if the current becomes leading the potential will tend to rise. A distinctive feature of this invention is that the generator in such cases may be automatically regulated to correspond with the various phase relations existing in the circuit under different conditions, so that should the current fall out of phase and become lagging such a change of itself brings about directly or indirectly the necessary regulation of the generator to suit the condition assumed. The same holds true if the current becomes leading instead of lagging. This result, generically stated, is secured by including in the circuit of the machine an electroresponsive device of such character that it takes cognizance, so to speak, of the existing phase relation at a given time, giving one response or producing one effect when the current lags and a different response or different effect when the current leads. These secondary effects are utilized to regulate or control the regulation of the generators or other apparatus requiring regulation.

In the specific apparatus hereinafter described the electroresponsive device answering this purpose is the exciter-dynamo, which, as will be explained, raises the voltage of the main dynamo when the current lags and reduces the voltage when the current leads. It is, however, evident that the same function can be secured by other apparatus and utilized in a variety of combinations in which the electroresponsive device is coupled either in series or in shunt relation to the circuit, so that such of the claims hereinafter made as relate to this part of the invention are intended to be generic.

In the embodiment of the different features of the invention specifically described hereinafter there is provided a main alternator, which I will assume to be a generator feeding a distribution system, though motors, rotary converters, or electrodynamic phase-controllers may be regulated in a similar manner. The main generator may be constructed in any ordinary manner. A continuous-current exciter of any ordinary description furnishes current for exciting the field-magnets of the main machine. This exciter not only provides a proper excitation for the alternator under its regular or normal load, but it varies the excitation automatically under different conditions in accordance with the ordinary principles of "compound winding," as these terms are ordinarily understood in the art, so that as the load increases the potential also increases correspondingly, or, if preferred, in a greater ratio, as in the case of over compounded machines. It is therefore possible to dispense with the commutator heretofore employed for rectifying the whole or a part of the current of a machine in order to make it self-compounding, together with all accessory devices for suppressing sparking, and so on. The simplest arrangement is to provide the main alternator with a single field-winding and to use only a single exciting-machine, which therefore plays the part both of the ordinary exciter and of all special means for compounding. It is, however, entirely possible to supply the initial field magnetization for the alternator from one source of current-supply and the varying excitation necessary for compounding from a separate regulated machine. The exciter comprises an armature with a series closed-coil winding and commutator of any ordinary pattern, and the field-magnet of the exciter when the machine is to run at the same speed as the main generator should have the same number of poles as the main machine. It is, however, only essential that the number of poles of the two machines and the speeds at which they are driven should be such that from an electrical standpoint the machines run in synchronism with one another, so that the alternations of the current from the main generator are in step with the movement of the exciter-armature across its poles. The current induced in the armature of the exciter is rectified by a commutator and excites its own field-magnets and also the field-magnets of the main machine, as has heretofore been customary. The current in the main generator is passed through the armature of the exciter, and in so doing develops alternating polarities therein which react upon the field magnetization of the exciter and so vary its voltage. The amount of this reaction and the consequent regulation secured will correspond with the strength of the main current passed through the armature and also the phase relation of the current.

The connections between the armatures of the two machines are so made that the polarities induced in the exciter-armature are of opposite sign to the adjacent field-poles at any given instant and somewhat ahead of the exciter-field magnetization. The result is that with increasing main current the current passing through the exciter-armature strengthens to a correspondingly greater degree the exciter-field, and thereby the excitation of the main alternator. If the current lags, as under an inductive load may occur, the magnetization produced by the alternating current passed through the exciter-armature comes more nearly in line with the exciter-field magnetization, thus strengthening its field more and increasing the excitation of the alternator. While, on the contrary, should the current lead, the magnetization of the exciter-armature due to this current is less in line with that of the exciter-field, and thereby strengthens it less or may even be in opposition to the exciter-field and so weaken it. In some cases the arrangement may be such that the polarities induced in the armature of the machine regulated by armature reaction will be of like sign to the adjacent field-poles, so that regulation is due to the differential rather than the cumulative action of the magnetic fields, the armature-poles in this case weakening instead of strengthening the field-poles. Such an arrangement is specially desirable in constant-current machines or systems, while the former arrangement is better adapted to constant-potential machines. If the machines are properly proportioned, the regulation secured in this manner may be entirely automatic, though adjustable resistances may be used in the field-magnet circuits of the machines as auxiliaries in securing the desired regulation or correcting the effects of imperfections in design or for adjusting the machines for different ratios of compounding. When the exciter has the same number of poles as the main machine, the two machines may be driven in synchronism by mounting their armatures upon the same shaft, or by running the armature of the exciter by a synchronous motor, or by the alternating current from the generator itself after the manner of a rotary converter. The alternating current of the main machine is passed through the armature of the exciter either by direct electrical connections or indirectly through the transformer or other inductive apparatus.

The accompanying drawings show embodiments of my invention.

Figure 1 is a diagram of an alternating generator and exciter and connections therefor constructed and arranged according to my invention, the exciter-armature being understood to be upon the same shaft as the armature of the main generator. Fig. 2 is a sectional elevation of an arrangement similar to the above except that a transformer is introduced between the main alternator and the exciter-armature. Fig. 3 shows a modification wherein the exciting-armature is synchronously driven by derived current from the line and need not be upon the same shaft. Fig. 4 shows a modification. Fig. 5 shows, diagrammatically, a further modification illustrating particularly a way in which the regulating effect of the main current upon the exciter may be controlled; and Figs. 6, 7, and 8 are diagrams explanatory of the mode of operation of the invention.

In Fig. 1, G represents an alternating-current generator having armature-coils A, field-magnet coils F, and collector-rings $r'\ r^2$, the latter being shown upon the left side of the drawings for clearness of illustration. Upon these rings bear the brushes $B'\ B^2$, connected to the line-wires 1 2, between which translating devices of any desired character are designed to be coupled in parallel. The field-magnet coils are shown wound to produce alternate poles in the usual way.

S is the shaft of the generator, and upon this shaft is fixed the armature $a$ of the exciting-machine E, which machine also has field-magnet coils $f$ wound to produce alternate poles, and in this particular embodiment of my invention equal in number to the poles of the alternator G.

C is a commutator on the shaft S, connected to the windings of the armature $a$, which are of the multipolar type corresponding to the number of pairs of poles of the field, and in the case illustrated a series winding adapted to twelve poles. Upon the commutator C bear the brushes $b'$ $b^2$ at points of opposite polarity, and from these brushes connections 3 4 lead from the brushes to the field-magnet coils of the alternator and of the exciter, which, as illustrated, are in series, but may be equally well in multiple. The commutator and brushes may be connected and arranged as is customary in any continuous-current machine of this type.

When the shaft is rotated, the exciter will act as an ordinary multipolar direct-current generator and will build up until the designed electromotive force is developed. This force may be adjusted to the proper amount by the regulating-resistances R, included in the circuit of the field-magnet coils $f$. The field-magnets F of the alternator are at the same time excited, and an alternating electromotive force is generated between the lines 1 2, the amount of current flowing depending upon the load. As the load increases it becomes necessary to increase the excitation of the field-magnets F—that is, to compound the machine. This result is obtained by passing the line-current through the armature $a$, as shown by the connections from the main armature to the collector-ring $r^2$, which tap the exciter-armature winding at the points $p$ $p'$. It is of course to be understood that this tapping may be accomplished either by collector-rings where the two machines are not mounted upon the same shaft or by direct connection (which is to be preferred, if convenient) where the exciter-armature is upon the same shaft with the alternator.

At 7 7 I show in dotted lines that the field-magnets of the two machines may be arranged in multiple and the switch $s$ may be employed to close the shunt-circuit 6 in order to build up more rapidly the field of the exciter-machine.

In many cases it will be preferable to effect an inductive transfer of the alternating current in order to facilitate controlling or varying the regulating effect of the main current upon the exciter and to permit of winding the exciter for current of comparatively low voltage. One such arrangement is illustrated in Fig. 2, wherein the letters refer to the same parts as in Fig. 1; but I also show, in addition to the apparatus in Fig. 1, a transformer T, the primary coil $t$ of which is connected in the circuit of the armature A, and its secondary $t'$ is connected to the armature $a$. Except as to this intermediate transformation, which may be of any character desired by the engineer, the arrangement and the action are the same as in Fig. 1.

In Fig. 3 I show a modification wherein the exciter-armature may be upon a separate shaft from the alternator and be driven by current taken from the main line by the derived circuit 8 9, the armatures being understood to run synchronously, and if the number of poles in the exciter be less the speed will be correspondingly greater. Two transformers are indicated in this figure, and they may be considered as in effect a single transformer, inasmuch as the secondary coils in circuit with the armature $a$ are in series with one another. In this case, however, the primary of the transformer $T'$ is in series with the armature A, while the primary of the transformer $T^2$ is in shunt across the mains 1 2 from the alternator G. The operation of the transformer $T'$ will therefore depend upon the current from the armature A, while that of the transformer $T^2$ will be dependent upon the potential between the mains 1 2, as is well understood.

In Fig. 4 I show that the interpolation of the exciter-armature may be made at any point in the winding of the armature of the main generator and that it is not necessary that it should be between one of the collector-rings and the end of the winding, as the same effect can be obtained by its insertion in other places, the arrangement of Fig. 1 being simply the preferred arrangement.

In Fig. 5 an arrangement is shown somewhat similar to that of Fig. 2, and in this figure corresponding parts are indicated by the same letters of reference, as heretofore described. The main alternator G and the exciter E are driven synchronously by belts passing around the pulleys P P' from the shaft K or in any other manner. The current from the main alternator is fed to the armature of the exciter through a transformer T, and the secondary winding of the transformer is divided into sections, more or less of which may be brought into circuit by a switch $s$. In this manner, as will be readily understood, the current transformed and passed through the exciter-armature may be regulated, and inasmuch as the regulating effect of this current on the exciter varies with the strength of the current the arrangement indicated furnishes a convenient means for manual regulation, or even for automatic regulation.

Figs. 6, 7, and 8 are intended to be explanatory of what I at present conceive to be the mode of operation of this method of regulating dynamo-electric machines. In these figures, 1, 2, 3, and 4 represent the field-poles of the exciter, which are alternately of a north and south polarity, as indicated. 5, 6, 7, and 8 represent poles on the exciter-armature, which, it is assumed, is to rotate across the field-poles to the left, as is indicated by the arrow. The alternating currents are tapped into the armature, preferably so that the polarities induced in the poles are of opposite sign to the adjacent field-poles, as represented by $s\ n$, and the adjustments are such that these polarities become a maximum just before the armature-poles stand opposite to the adjacent field-poles. With this arrangement it is evident that the field-poles 1, 2, 3, and 4 will be strengthened by the polarities induced in the adjacent armature-poles and that this strengthening effect will become more or less great as variations in the strength of the armature-current strengthen or weaken the armature-polarities, thus giving a compounding effect to the exciter, and indirectly to the main alternator, which corresponds with the current generated in the main alternator. If, now, the current lags, the polarities induced in the armature will reach a maximum an instant later than when the currents are in phase, as is assumed to be the case in Fig. 6. Hence at the time the armature-polarities reach their maximum the poles 5, 6, 7, and 8 will be more nearly in line with the poles 1, 2, 3, and 4, thereby strengthening the field-poles to a greater degree and raising the potential of both the exciter and main machines. This is shown in Fig. 7. If, on the other hand, the current leads, the armature-polarities will reach a maximum when the poles 5, 6, 7, and 8 are less in line with the corresponding field-poles, as indicated in Fig. 8, and their strengthening effect upon the field-poles will be less than in the position shown in Fig. 6. In this way the potential of the exciter is automatically lowered and the potential of the main machine lowered correspondingly. It will be seen that the amount and character of the compounding depends upon the relative proportioning of the various parts, &c., and upon the angle at which the main circuit enters and leaves the exciter-armature.

It is obvious that the novel features herein described, and referred to in the claims, are applicable to multiphase machines and systems, as well as to the single-phase machines, and by reason of the complication of the compounding arrangement in multiphase systems are even more desirable. In such cases the arrangement shown in Fig. 1 is extremely desirable and may readily be adopted, the only differences being such as would exist in the machine itself, the armature-winding A being branched into several coils and the connection from the exciter being made to the common connection or junction, or, rather, the exciter-armature may be made to serve the purpose of this common connection or junction.

Where I refer to parts as being "connected," it may mean either directly connected or connected through transformation. The term "commutator" is also used in a broad sense as a rectifying device, and should, when so used, be taken to include both the commutator proper and the brushes coöperating with the same, and, furthermore, in using the term "alternating" I mean to include multiphase alternating currents as well as single-phase currents, since I do not mean to limit the claims in this case to the single-phase currents, but, on the contrary, I aim to include multiphase systems within the scope of the claims.

I have employed in the claims the term "alternating-current machine," and I mean to include in that term any synchronizing alternating machine, whether generator, synchronous motor, rotary transformer, or compensator, either generating, utilizing, or controlling alternating currents of one or many phases, the modifications attending the employment of my improved method in such cases being apparent to electrical engineers—such, for instance, as that compensation for lead and lag in the current is reversed in a synchronous motor with reference to the direction of compensation in a generator.

What I claim as new, and desire to secure by Letters Patent of the United States, is—

1. The combination of an alternating-current generator, an exciter having an armature and field-magnet independent of the corresponding elements of the generator, means for driving said exciter, and means for superposing upon the current in the armature of the exciter a current of a magnitude and phase varying in accordance with the magnitude and phase of the current from the main generator, and thereby regulating the said main generator both for inductive drop and resistance drop.

2. The combination with an alternating-current generator of an exciter therefor, and means for superposing upon the current in the armature of the said exciter a current varying in magnitude and phase in accordance with the current in the main generator, the connections by which the said current enters and leaves the exciter-armature being made at such points that any increase in the lag of the current in the main circuit will add to the exciter-voltage.

3. The combination of a dynamo-electric machine, comprising field-magnets and a commutated armature having a single armature-winding, with a source of alternating currents, and means for passing through said armature alternating currents from said alternating source, whose alternations are synchronous with the magnetic phases induced in said armature by its field-magnets, substantially as set forth.

4. The combination of a dynamo-electric machine having an armature which revolves in a magnetic field, a source of alternating current, and means for connecting said source of current with the armature-winding of said dynamo-machine at such points that the polarities induced in the armature by the alternating current are of opposite sign to the adjacent field-magnet poles and somewhat ahead of the magnetization induced in the armature by its own field-magnets, substantially as set forth.

5. The combination with the field-magnets and armature of an alternating-current machine of an exciter-machine comprising an armature, field-magnets and a commutator, the commutator being connected to the armature-winding of the exciter and delivering current to the field-magnet systems of both the main alternator and exciter, and connections from the armature of the main alternator to that of the exciter for passing the current of the main machine through the armature of the exciter, substantially as set forth.

6. The combination of an alternating-current dynamo-electric machine, with an exciter having a commutated armature connected with the field-coils of the main machine, and a transformer whose windings are respectively in circuit with the external circuit of the main machine and with the armature of the exciter.

7. The combination of an alternating-current dynamo-electric machine, with an exciter-machine, and inductive apparatus connecting indirectly the armature-circuits of the two machines, and means for varying the current through said inductive apparatus, substantially as set forth.

8. The method of regulating an alternating-current dynamo-electric machine which consists in causing the main current to strengthen the exciting-current with an increase of lag, and to weaken it with an increase of lead.

9. The method of regulating an alternating-current dynamo-electric machine, which consists in automatically increasing its internal electromotive force with any positive increase of lag of the current passing through the machine, and decreasing its internal electromotive force with any negative increase of lag.

10. The method of regulating a dynamo-electric machine, which consists in automatically increasing its field-magnet excitation with any increase of load and with any increase of lag, and decreasing its field-magnet excitation with any decrease of load and with any decrease of lag.

11. The combination with a dynamo-electric machine, of a source of current supplying exciting-coils on its field-magnets, and electroresponsive means controlled by the circuit of the machine for increasing the exciting-current with an increase of lag or a decrease of lead, and decreasing it with a decrease of lag or an increase of lead.

In witness whereof I have hereunto set my hand this 24th day of October, 1894.

EDWIN WILBUR RICE, JR.

Witnesses:
B. B. HULL,
C. L. HAYNES.